United States Patent

Zellmer et al.

[11] Patent Number: 5,864,645
[45] Date of Patent: Jan. 26, 1999

[54] DOUBLE-CORE LIGHT-CONDUCTING FIBER, PROCESS FOR PRODUCING THE SAME, DOUBLE-CORE FIBER LASER, AND DOUBLE-CORE FIBER AMPLIFIER

[75] Inventors: Holger Zellmer, Hanover; Joern Bonse, Lehrte-Arpke; Sonja Unger; Volker Reichel, both of Jena, all of Germany

[73] Assignee: LDT GmbH & Co. Laser-Display-Technologie KG, Gera, Germany

[21] Appl. No.: 836,588
[22] PCT Filed: Sep. 25, 1996
[86] PCT No.: PCT/EP96/04187
 § 371 Date: May 16, 1997
 § 102(e) Date: May 16, 1997
[87] PCT Pub. No.: WO97/12429
 PCT Pub. Date: Apr. 3, 1997

[30] Foreign Application Priority Data

Sep. 25, 1995 [DE] Germany ............... 195 35 526.1

[51] Int. Cl.⁶ ............................................. G02B 6/22
[52] U.S. Cl. ................................... 385/126; 372/6
[58] Field of Search ............................ 372/6; 385/123, 385/126, 127

[56] References Cited

U.S. PATENT DOCUMENTS

| | | | |
|---|---|---|---|
| 4,815,079 | 3/1989 | Snitzer et al. | 372/6 |
| 5,373,576 | 12/1994 | Minns et al. | 385/126 |
| 5,418,880 | 5/1995 | Lewis et al. | 385/123 |
| 5,530,710 | 6/1996 | Grubb | 385/127 |

Primary Examiner—Hung N. Ngo
Attorney, Agent, or Firm—McAulay Nissen Goldberg Kiel & Hand, LLP

[57] ABSTRACT

A double-core light-conducting fiber comprise a pump core, a laser core which is arranged centrically in the pump core, and a cladding surrounding the pump core. The pump core which is constructed with a substantially circular cross section has at least one ground portion on the outside which extends in the light direction of the double-core light-conducting fiber and amounts to 1% to 49% of the diameter of the pump core. A process for the production of the double-core light-conducting fiber and to a double-core fiber laser and to a double-core fiber amplifier are also disclosed which use the double-core light-conducting fiber according to the invention. The substantially round pump core with its centrically arranged laser core enables a simple connection with other fiber-optic components and a simple coupling in of the pumping light.

16 Claims, 6 Drawing Sheets

DOUBLE-CORE LIGHT-CONDUCTING FIBER, PROCESS FOR PRODUCING THE SAME, DOUBLE-CORE FIBER LASER, AND DOUBLE-CORE FIBER AMPLIFIER

BACKGROUND OF THE INVENTION a) Field of the Invention

The invention is directed to a double-core light-conducting fiber, a process for the production of a double-core light-conducting fiber, a double-core fiber laser and a double-core fiber amplifier. The invention is applied, for example, in light-beam communication, laser technology, laser measurement technology, medical technology, and image display by means of laser radiation.

b) Description of the Related Art

A double-core fiber laser with a pump core which is round in cross section and in which a laser core is arranged in the center and is enclosed by cladding is already known from "Optics Letters", Vol. 20, No. 6, pages 578–580. This known double-core fiber laser has the disadvantage that only a portion of the pumping light is absorbed in the central laser core because of helix beams, as they are called, which are formed in the interior of the pump core and which do not intersect the laser core and are therefore not absorbed.

A double-core fiber laser with a round pump core and acentric laser core is known from U.S. Pat. No. 4,815,079. This double-core fiber laser is difficult to manufacture and the laser core tends to deform elliptically in cross section. The patent also discloses a double-core fiber laser with a pump core having a rectangular cross section and a centric laser core.. This double-core fiber laser is also complicated to manufacture. Pumping light losses occur at the edges of the pump core and the coupling in of pumping light from diode lasers is more difficult than with double-core fiber lasers having a round pump core because of the rectangular geometry. Further, fiber lasers with a rectangular cross section are not compatible with standard fiber components.

OBJECT AND SUMMARY OF THE INVENTION

The primary object of the present invention is to develop a novel double-core light-conducting fiber which can be produced more simply, has a higher efficiency in amplifier operation, and is compatible with fiber-optic production processes and standard components. Further indicated are a double-core fiber laser and a double-core fiber amplifier which can be produced more simply and enable a substantially complete absorption of the pumping light in the laser core and accordingly achieve a high optical efficiency.

This object is met by means of the invention in a double-core light-conducting fiber, by the invention in a process for the production of a double-core light-conducting fiber, by the invention in a double-core fiber laser, and by the invention in a double-core fiber amplifier.

The invention proposes a double-core light-conducting fiber with a round pump core having a centrically embedded laser core and at least one ground off portion on the outer side which extends in the longitudinal direction (direction of light propagation) of the double-core light-conducting fiber, resulting in a pump core with a D-shaped cross section. This ground portion causes an interruption in the symmetry of the pump core so that helix beams can no longer occur. Instead, the beam path in the pump core is chaotic so that the pump light which is coupled in is absorbed virtually completely in the laser core. The substantially round fiber with the centric laser core enables a simple connection with fiber-optic components and a simple coupling in of the pumping light.

In comparison to standard processes, the process for producing the double-core light-conducting fiber according to the invention requires only one process step which is relatively simple to accomplish. The grinding of the cylindrical surface of the preform can be carried out by means of conventional surface grinding machines which are used in the optics industry.

The double-core fiber laser which is constructed with the double-core light-conducting fiber according to the invention achieves a higher optical efficiency than conventional fiber lasers and requires a shorter fiber length for complete absorption of pumping light. As a result of the substantially round pump core, the coupling in of pumping radiation, especially from fiber-coupled pump sources, can be realized in a particularly simple manner with low losses.

The double-core fiber amplifier which is constructed with the double-core light-conducting fiber according to the invention achieves a higher optical efficiency than fiber amplifiers which are constructed from conventional double-core fibers. As a result of the substantially round pump core, the coupling in of pumping radiation, especially from fiber-coupled pump sources, can be realized in a particularly simple manner with low losses.

BRIEF DESCRIPTION OF THE DRAWINGS

The invention will be explained more fully in the following with reference to drawings.

DESCRIPTION OF THE PREFERRED EMBODIMENTS

Figure 1:
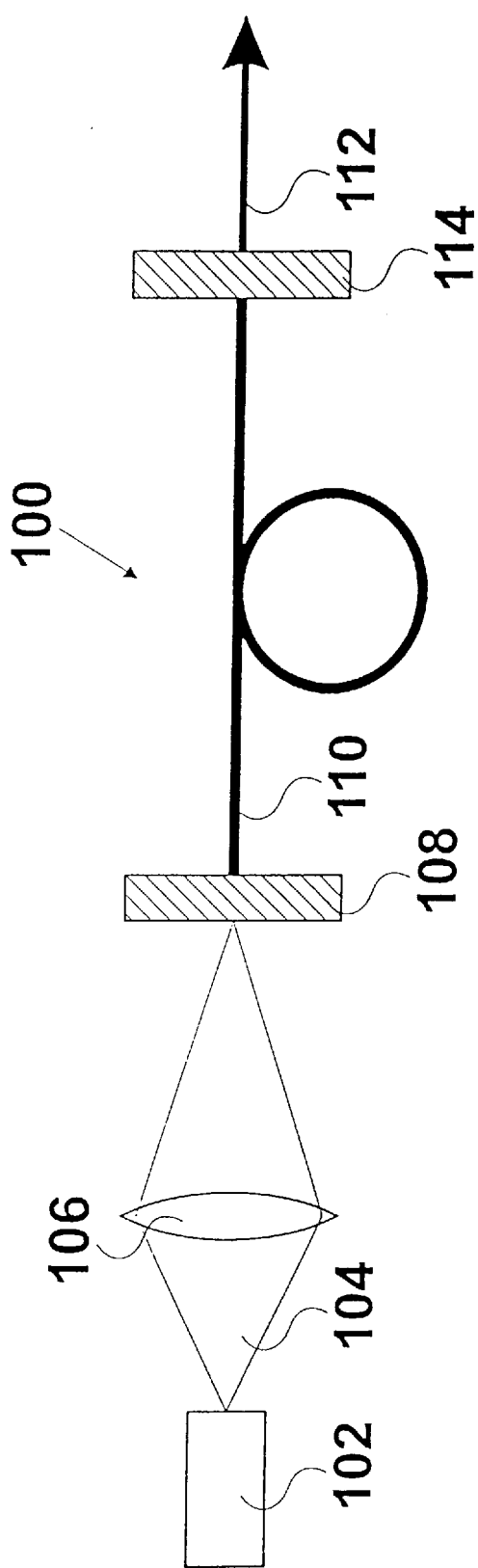
FIG. 1 is a schematic view of the basic construction of a double-core fiber laser.

FIG. 1 shows the basic construction of a fiber laser 100 comprising a laser diode 102, whose radiation 104 is coupled into a double-core light-conducting fiber 110 via coupling optics 106 and a coupling-in mirror 108. The laser radiation 112 generated in the fiber 110 is coupled out via a coupling-out mirror 114. The two mirrors 108 and 114 are arranged directly at the fiber ends.

Figure 2:
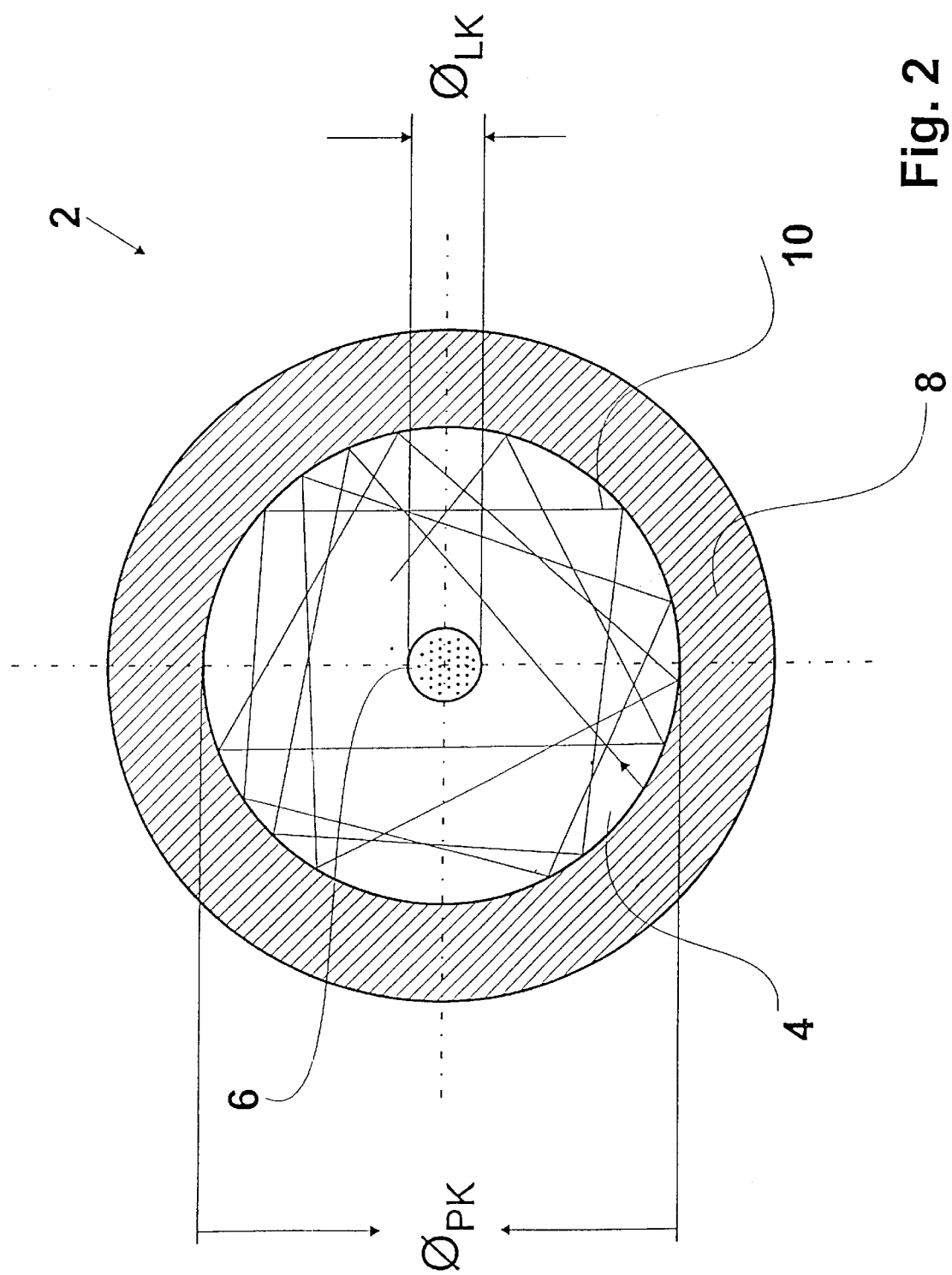
FIG. 2 shows a double-core fiber laser with a round pump core according to the prior art.

FIG. 2 shows a cross-sectional view of a double-core light-conducting fiber 2 known from the prior art. This double-core light-conducting fiber has a pump core 4 with a round cross section which is made of silica glass, for example. A round laser core 6, e.g., made of a neodymium-doped medium or medium doped with another rare-earth metal is arranged centrically in the pump core 4. The pump core 4 is enclosed by a sheath or cladding 8 around its outer diameter. The cladding is made, for example, from transparent polymer or glass with a lower refractive index than the pump core. The pump core 4 serves as cladding for the laser core 6 and also as a waveguide with a high numerical aperture for the pumping light.

FIG. 2 shows that helix beams 10 which do not intersect the laser core 6 and can therefore not be absorbed by the laser core are formed predominantly in a conventional double-core light-conducting fiber with a pump core 4 having a circular cross section. Such double-core light-conducting fibers can therefore absorb only approximately 10% of the pump radiation in laser operation.

Figure 3:
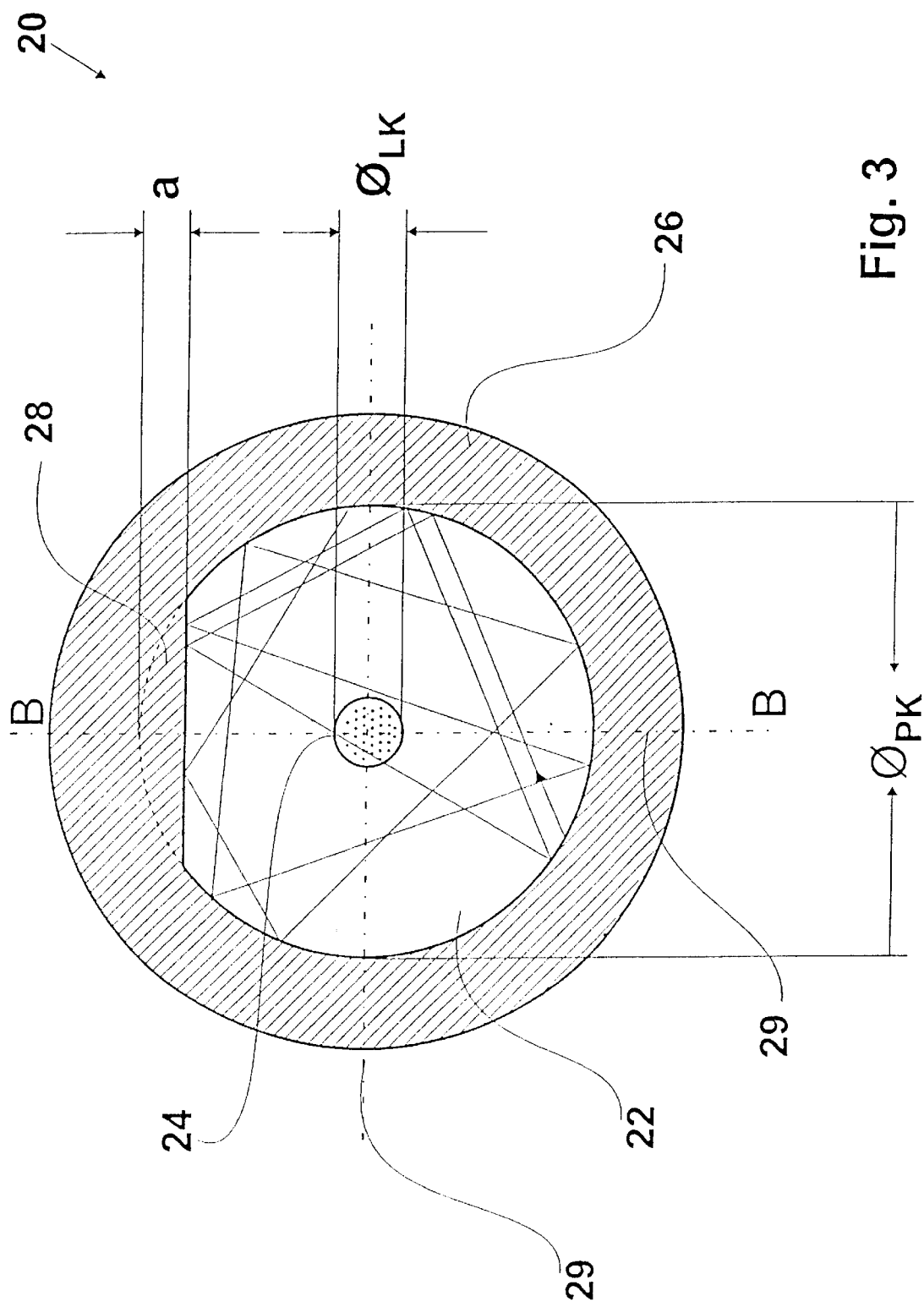
FIG. 3 shows a cross-sectional view of a double-core light-conducting fiber constructed according to the invention.
Figure 4:
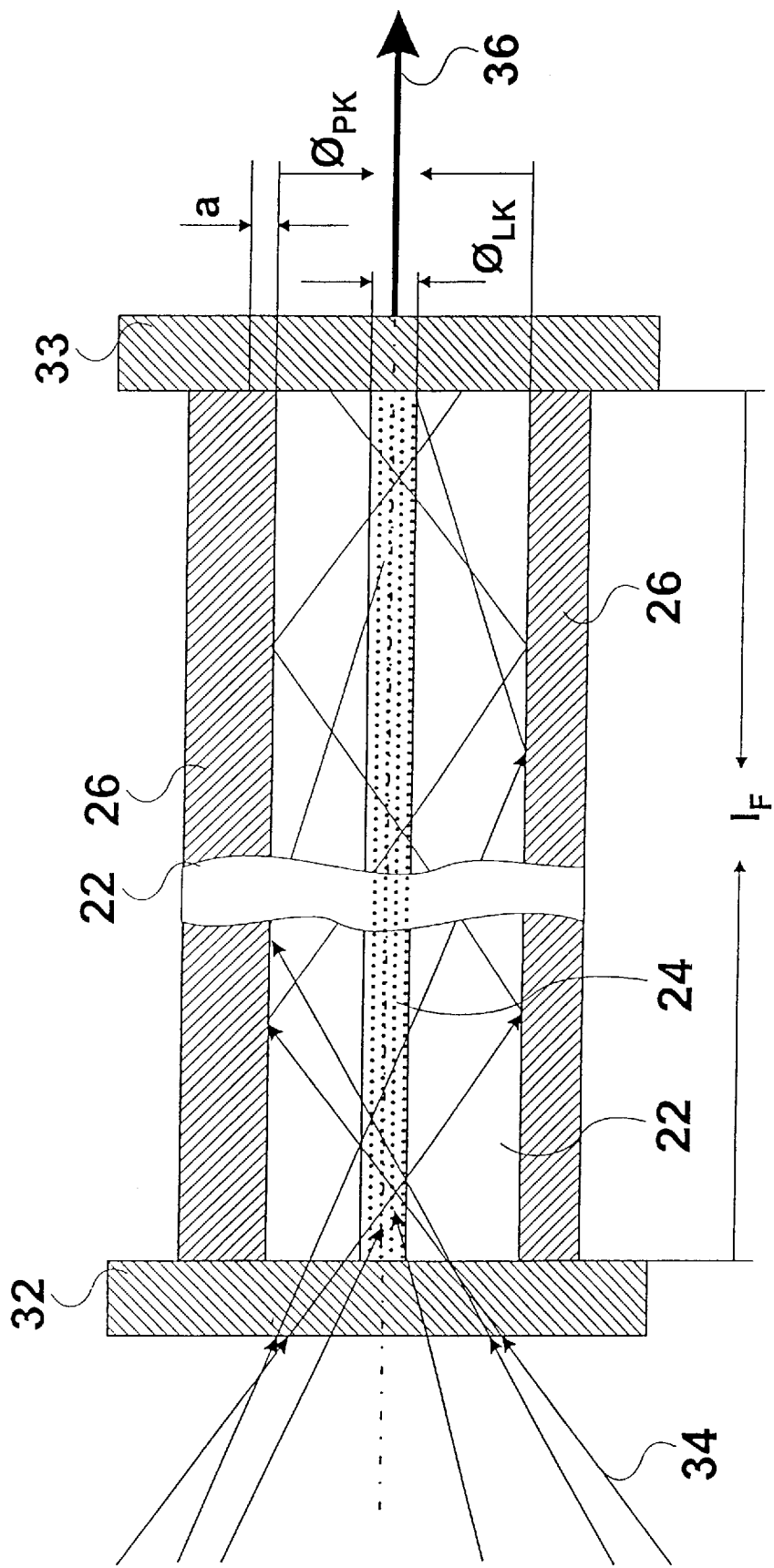
FIG. 4 shows a portion of a section B—B through the double-core light-conducting fiber according to FIG. 3.

FIG. 3 shows a cross section and FIG. 4 shows a longitudinal section of a double-core light-conducting fiber 20 constructed according to the invention with a pump core 22 which is formed of silica glass, for example, and in which a round laser core 24 formed of neodymium-doped medium, for example, is arranged centrically with respect to a common axis of symmetry 29 and is enclosed by a transparent cladding 26 which has a low refractive index and is made of a polymer, for example.

The double-core light-conducting fiber 20 shown in FIG. 4 contains mirrors 32 and 33 which are arranged, e.g., evaporated, on the ends of the fibers, resulting in a laser resonator arrangement.

In contrast to conventional double-core light-conducting fibers 2 according to FIG. 2, the pump core 22 according to FIG. 3 and FIG. 4 is provided at its circumferential surface with a ground portion 28 in the longitudinal direction of the fiber, the rest of its cross section being circular. The ground portion 28 interrupts the circular symmetry of the double-core light-conducting fiber. FIG. 3 shows that a chaotic beam path is formed by the ground portion 28 so that practically all light components guided in the fiber can interact with the laser core 24 along the longitudinal extension of the double-core light-conducting fiber and virtually 100-percent absorption of pumping light is achieved, given a suitable fiber length. The ground portion prevents formation of helix beams and can be produced easily. However, more than one ground portion may also be provided at the pump core, e.g., three ground portions at an angle of 120° which are dimensioned in such a way that the essentially round shape of the pump core is retained.

Possible dimensions of the double-core light-conducting fiber 20 are:

| | |
|---|---|
| pump core diameter $\varnothing_{PK}$ (not at ground portion): | 20 to 600 $\mu$m |
| laser core diameter $\varnothing_{LK}$: | 1.5 to 20 $\mu$m |
| thickness of cladding: | 5 to 100 $\mu$m |
| ground portion a: | 1 to 49% of pump core diameter $\varnothing_{PK}$ |

For a laser application, the length of the fiber $I_F$ to be used is advisably between 0.3 and 50 m, and between 0.3 and 10 m for amplifier applications.

The fiber resonator shown in FIG. 1 and FIG. 4 is constructed in that dielectric mirrors are arranged on the ends of the double-core light-conducting fiber, wherein a mirror 108 (FIG. 1), 32 (FIG. 4), respectively, which has a high reflection factor for the laser light and high transmission factor for the pumping light 104 (FIG. 1), 34 (FIG. 4) is used on the pumping side and in-coupling side, respectively, and a mirror 114 (FIG. 1), 33 (FIG. 4) which has a high reflection factor for the pumping light and high transmission factor for the laser light 112 (FIG. 1), 36 (FIG. 4) is used on the out-coupling side. The mirrors 32, 33, 108, 114 can be arranged directly on the end face of the fiber or mirrors can be pressed onto the end face of the fiber or placed before the ends of the fiber.

The pump radiation is reflected repeatedly within the double-core light-conducting fiber at the interface between the cladding 26 and pump core 22 and, after one or more reflections, intersects the laser core 24 with which the light interacts until it is absorbed in the laser core 24.

Figure 5:
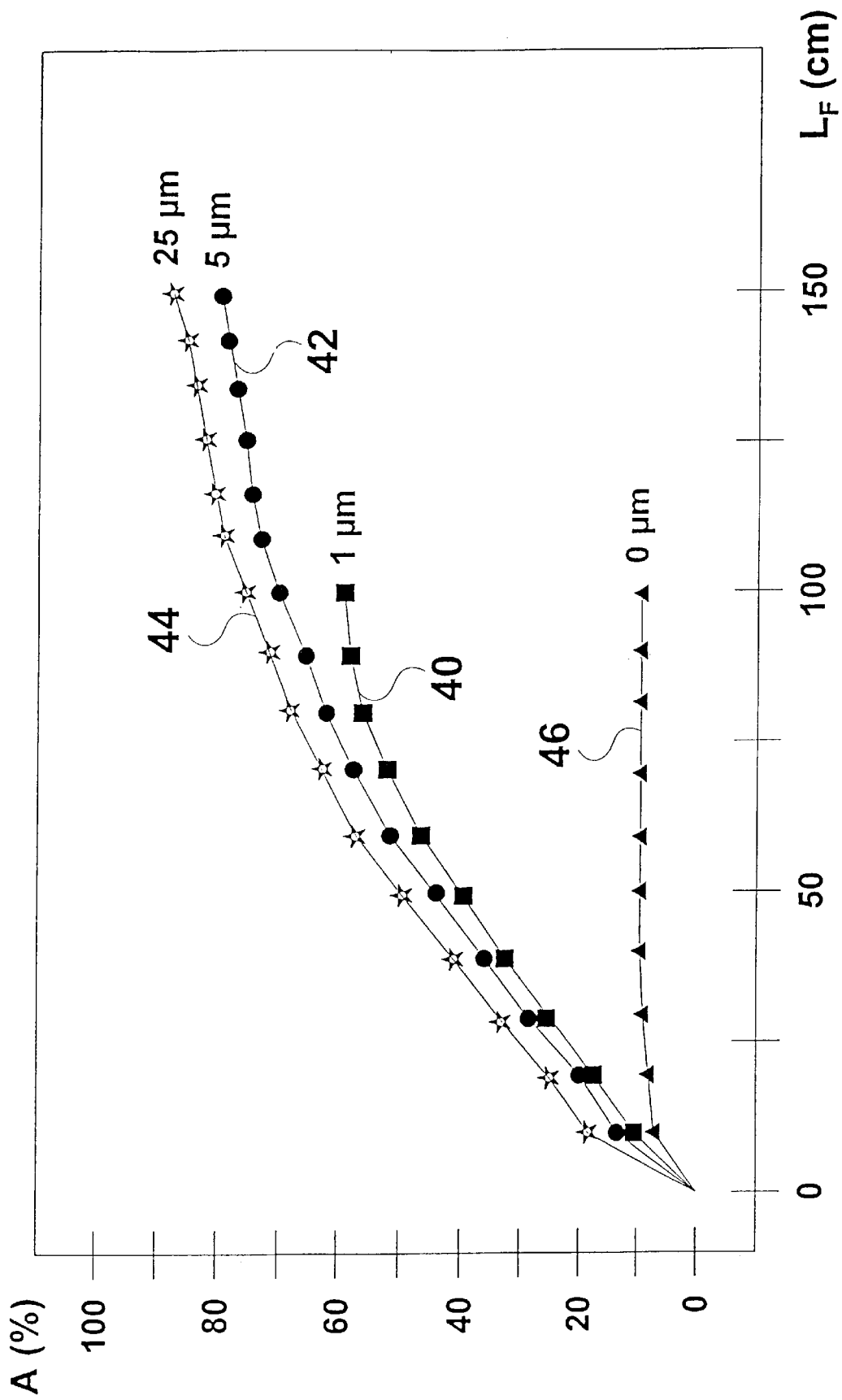
FIG. 5 is a graph showing the pumping light absorption as a function of the magnitude of the ground portion and fiber length.

FIG. 5 illustrates the pumping light absorption A in a double-core fiber laser according to FIGS. 1 and 4 as a function of the ground portion and the fiber length $I_F$. Curve 40 with a 1-$\mu$m ground portion, curve 42 with a 5-$\mu$m ground portion, and curve 44 with a 25-$\mu$m ground portion, in relation to a pump core with a diameter of 100 $\mu$m, show the pumping light absorption A compared with a double-core light-conducting fiber with a round pump core according to the prior art in which there is no ground portion (compare curve 46). It will be seen that even in a pump core which is ground only very slightly the absorption A is appreciably greater than the absorption A in a double-core light-conducting fiber with a conventional round pump core. Further, the absorption A increases as the fiber length increases, whereas the increase in absorption as the ground portions become larger is not so pronounced.

The outer geometry of the pump core containing the laser core is produced by grinding the preform in the range of 1 to 49 percent of the diameter of the preform. The preform is drawn into the fiber after grinding at a lower temperature than the customary temperature to retain the D-shaped geometry. The material composition of the laser fibers corresponds to that of standard fibers known from the literature. The required refractive index curve in the fiber is produced by co-doping with germanium, phosphorus and fluorine.

Figure 6:
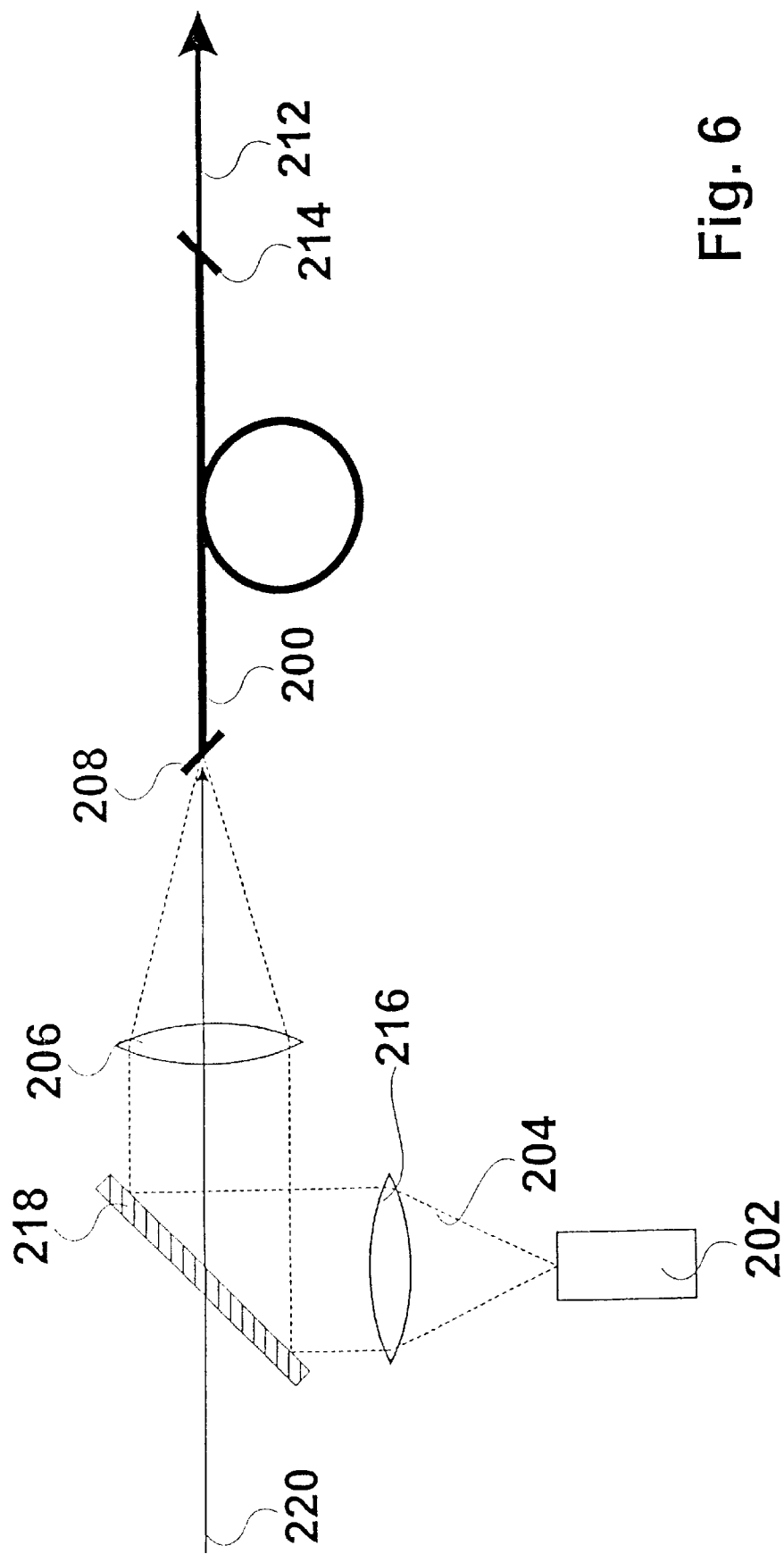
FIG. 6 is a schematic view showing the basic construction of a double-core fiber amplifier.

FIG. 6 shows the basic construction of a double-core fiber amplifier comprising a pump source 202 whose radiation 204 is collimated by a collimator 216 and coupled into the double-core light-conducting fiber 200 via the fiber end face 208 by means of a beam combining device 218, e.g., a dichroitic mirror, with coupling optics 206. The fiber end faces 208 and 214 are provided with an antireflection coating or are cut at an angle to the optical axis in order to prevent optical feedback within the double-core light-conducting fiber. The signal radiation 220 is coupled into the double-core light-conducting fiber by means of the beam combining device 218 and the coupling optics 206. The amplified signal radiation 212 is coupled out at the fiber end face 214 of the double-core light-conducting fiber located opposite to the coupling-in side.

Exemplary dimensions for the four-level laser or amplifier systems are as follows:

| | |
|---|---|
| laser core diameter: | 5 $\mu$m |
| pump core diameter: | 125 $\mu$m |
| ground portion: | 20 $\mu$m |

With the indicated geometry and a pumping wavelength of 810 nm, a fiber laser doped with 1300 ppm neodymium achieves an optical efficiency of greater than 40% at a laser wavelength of 1060 nm and 2 W output power.

Exemplary dimensions for three-level laser or amplifier systems and up-conversion lasers are:

| | |
|---|---|
| laser core diameter: | 3.5 $\mu$m |
| pump core diameter: | 20 $\mu$m |
| ground portion: | 5 $\mu$m. |

With the indicated geometry, a fiber laser doped with praseodymium and ytterbium can achieve an optical efficiency of greater than 20% at a laser wavelength of 635 nm and more than 1 W output power.

While the foregoing description and drawings represent the present invention, it will be obvious to those skilled in the art that various changes may be made therein without departing from the true spirit and scope of the present invention.

What is claimed is:

1. A double-core light-conducting fiber comprising:
   a pump core;
   a laser core which is arranged centrically in the pump core; and
   a cladding surrounding the pump core;
   said pump core being constructed with a substantially circular cross section and having at least one ground portion on the outside which extends in the light propagation direction of the double-core light-conducting fiber and which amounts to 1% to 49% of the diameter of the pump core.

2. The double-core light-conducting fiber according to claim 1, wherein the pump core has a diameter $\emptyset_{PK}$ without the ground portion which is in the range of 5 µm to 600 µm, and the laser core has a diameter $\emptyset_{LK}$ which is in the range of 1.5 µm to 20 µm, and the ground portion, a, measurable at the circumference of the pump core which is 1 µm to 200 µm, depending on the laser light wavelength and application.

3. The double-core light-conducting fiber according to claim 1, wherein the cladding of the double-core light-conducting fiber is made from a polymer material with a refractive index which is lower than the pump core and a thickness or more than roughly 5 µm.

4. The double-core light-conducting fiber according to claim 1, wherein said double-core light-conducting fiber has two end faces, and each end face of the double-core light-conducting fiber is aligned orthogonally or at an angle of less than 90° to the optical axis, has optical quality and is coated, at least in the region of the laser core, with a reflective or antireflective layer with respect to determined wavelength ranges.

5. The double-core light-conducting fiber according to claim 1, wherein the cladding of the double-core light-conducting fiber is made from a glass material with a refractive index which is lower than the pump core and a thickness or more than roughly 5 µm.

6. A process for producing a double-core light-conducting fiber comprising the following process steps:
   producing a cylindrical preform from quartz or glass using a standard process; and
   drawing the heated preform to the glass fiber;
   after the preform is produced, grinding the cylindrical outer surface of the preform at least once to produce a ground portion, said ground portion being 1% to 49% of the diameter of the preform; and
   drawing the double-core light-conducting fiber from the ground preform, while adjusting the drawing temperature of the preform in such a way that the outer geometry of the preform and the outer geometry of the pump core remain congruent.

7. The process for producing a double-core light-conducting fiber according to claim 6, wherein after the preform is ground, a glass layer or quartz layer with a lower refractive index than the material of the subsequent pump core is applied to the preform with a thickness such that the double-core light-conducting fiber has a diameter of at least roughly 80 µm after the preform is drawn.

8. The process for producing a double-core light-conducting fiber according to claim 6, wherein the outer diameter of the preform is between 5 mm and 20 mm and the ground portion of the preform is between 1 mm and 8 mm, and the preform is produced with constant outer dimensions in the cylindrical direction, and a double-core light-conducting fiber with a constant diameter of the pump core, as measured at the location where there is no ground portion, is drawn in the range of 5 µm to 600 µm.

9. A double-core fiber laser comprising the following component groups arranged in the light direction:
   a pump source;
   coupling-in optics;
   a first dielectric mirror which corresponds to the start of a double-core light-conducting fiber;
   the double-core light-conducting fiber comprising a pump core; a laser core which is arranged centrically in the pump core, and a cladding surrounding the pump core, and further comprising: a second dielectric mirror which corresponds to the end of the double-core light-conducting fiber;
   said laser also including that:
   said pump core, which is constructed with a substantially circular cross section, having at least one ground portion on the outside which extends in the light direction of the double-core light-conducting fiber and which amounts to 1% to 49% of the diameter of the pump core.

10. The double-core fiber laser according to claim 9, wherein the length of the double-core light-conducting fiber is greater than 0.1 m.

11. The double-core fiber laser according to claim 9, wherein, for four-level laser systems, the diameter of the pump core at a location without a ground portion (28) is 75 µm to 600 µm, and the diameter of the laser core is 2 µm to 20 µm, and the ground portion measurable at the circumference of the pump core is 5 µm to 100 µm.

12. The double-core fiber laser according to claim 9, wherein, for three-level laser systems, and up-conversion laser systems the diameter of the pump core at a location without a ground portion is 10 µm to 50 µm, and the diameter of the laser core is 2 µm to 10 µm, and the ground portion measurable at the circumference of the pump core is 1 µm to 15 µm.

13. A double-core fiber amplifier comprising the following component groups arranged in the direction of light:
   a pump source;
   collimator optics;
   a device for beam-combining;
   coupling-in optics;
   an antireflection fiber end face or fiber end face inclined relative to the optical axis as input for the pumping light and the optical signal;
   a double-core light-conducting fiber comprising:
   a pump core;
   a laser core which is arranged centrically in the pump core;
   and
   a cladding surrounding the pump core;
   said amplifier further comprising an antireflection fiber end face or fiber end face inclined relative to the optical axis as output for the amplified optical signal;
   said pump core being constructed with a substantially circular cross section and having at least one ground portion on the outside which extends in the light direction of the double-core light-conducting fiber and which amounts to 1% to 49% of the diameter of the pump core.

14. The double-core fiber amplifier according to claim 13, wherein the length of the double-core light-conducting fiber is greater than 0.1 m and the greatest length is determined in that the amplified optical signal is greater than the amplified spontaneous emission during operation, wherein the greatest double-core fiber length is less than 50 m.

15. The double-core fiber amplifier according to claim 13, wherein, for four-level laser systems, the diameter of the pump core at a location without a ground portion is 75 $\mu$m to 600 $\mu$m, and the diameter of the laser core is 2 $\mu$m to 20 $\mu$m, and the ground portion measurable at the circumference of the pump core is 5 $\mu$m to 100 $\mu$m.

16. The double-core fiber amplifier according to claim 13, for visible light, wherein, for three-level laser systems and up-conversion laser systems, the diameter of the pump core at a location without a ground portion is 10 $\mu$m to 50 $\mu$m, and the diameter of the laser core is 2 $\mu$m to 10 $\mu$m, and the ground portion measurable at the circumference of the pump core is 1 $\mu$m to 15 $\mu$m.

* * * * *